United States Patent
Imoto et al.

[15] 3,687,878
[45] Aug. 29, 1972

[54] PROCESS FOR PREPARING A GRAFT-COPOLYMERIZED CELLULOSE

[72] Inventors: Minoru Imoto, 3-46, Oka-Minamicho, Hirakate-shi; Kiichi Takemoto, 32, Sumie-Nishi-3-chome, Sumiyoshi-ku, Osaka; Ching yun Huang, 607, Sakuragaoka, Minoo-shi, all of Japan

[22] Filed: Dec. 1, 1969

[21] Appl. No.: 881,329

Related U.S. Application Data

[63] Continuation-in-part of Ser. No. 636,252, May 5, 1967, abandoned.

[52] U.S. Cl. ............ 260/17.4 GC, 8/116, 8/DIG. 18
[51] Int. Cl. ............................................ C08b 15/00
[58] Field of Search ........ 260/17.4 GC; 8/116.2, 116, 8/DIG. 16, DIG. 18

[56] References Cited

UNITED STATES PATENTS

| | | | |
|---|---|---|---|
| 2,991,269 | 7/1961 | Nozaki | 260/45.5 |
| 3,088,791 | 5/1963 | Cline et al. | 8/115.5 |
| 3,101,276 | 8/1963 | Hendrichs | 117/56 |
| 3,107,206 | 10/1963 | Cottet et al. | 204/154 |
| 3,189,664 | 6/1965 | Nozaki | 260/881 |
| 2,955,015 | 10/1960 | Segro et al. | 8/116 |
| 3,313,591 | 4/1967 | Tanner | 8/115.5 |

OTHER PUBLICATIONS

Kesting et al., " The Grafting of Styrene to Cellulose by Mutual and Pre-Irradiation Techinque" , in Macromolekulare Chemie 65, 248– 249 (1963) Review of Textile Progress 15, 34– 35 (1963), The Textile Institute, Society of Dyers and Colorists, Butterworth & Co., Ltd (1964).

*Primary Examiner*—William H. Short
*Assistant Examiner*—E. A. Nielsen
*Attorney*—Fisher, Christen & Sabol

[57] ABSTRACT

A process for the graft-copolymerization of at least one vinyl monomer on a cellulose, which comprises heating a system consisting of a fibrous cellulose of wood, pulp, cotton, hemp or the like, at least one vinyl monomer such as, for typical example, methyl methacrylate, ethyl methacrylate, methacrylic acid, acrylonitrile, styrene or the like and water, the amount of water being at least 30 times the weight of the cellulose used, in the form of a heterogeneous system, under atmospheric or elevated pressure at a temperature from room temperature to the boiling point of water, in the absence of polymerization initiator and emulsifying agent. This copolymer is formed to semitransparent paper or film-like material by hot press.

7 Claims, No Drawings

PROCESS FOR PREPARING A GRAFT-COPOLYMERIZED CELLULOSE

CROSS-REFERENCES TO RELATED APPLICATIONS

This is a continuation-in-part application of U.S. Pat. application Ser. No. 636,252, filed on May 5, 1967 now abandoned.

The present invention relates to a novel process for the preparation of a graft-copolymerized cellulose, which comprises heating a system consisting of a cellulose, at least one vinyl monomer and water in the absence of a polymerization initiator and an emulsifying agent, thereby graft-copolymerizing said vinyl monomer on the cellulose.

As a method of graft-copolymerizing vinyl monomers on a cellulose, there have theretofore been known a chemical process in which an initiator is used and a physical process in which a radiation is used. In the chemical process, a cellulose is dispersed in a solvent, a peroxide initiator is added to the resulting dispersion and the resulting mixture is heated to cause chain transfer, whereby the vinyl monomer is grafted on the cellulose at the resulting activated points. In the graft cellulose prepared according to said chain transfer process, however, the amount of vinyl polymer side chain is small, that is, only several 10 percent by weight based on the weight of the cellulose. Further, in said process, the graft-efficiency is low, and it is necessary to employ a solvent and an initiator.

In the physical process, a vinyl monomer is mixed with a cellulose or a cellulose is impregnated with a vinyl monomer, and the resulting mixture is irradiated with a high energy radiation to form activated points, at which points the vinyl monomer is graft-copolymerized on the cellulose. This process is disclosed in, for example, U.S. Pat. No. 3,107,206 to Cottet, and Die Makromolekulare Chemie 65, 248 (1963) by Kesting et al. However, according to said physical process, mass production is very difficult in view of apparatus for said process, and radioactive ray damage is unavoidable. In each of said two processes, there is employed a means for forming activated points on a cellulose, and hence, these processes cannot be said to be a non-catalyzed polymerization.

Further, Imoto, Kondo and Takemoto [Kogyo Kagaku Zasshi (Journal of the Chemical Society of Japan, Industrial Chemistry Section) 68, 1302 (1965)] have found that vinyl monomers can be graft-copolymerized on cellulose by heating a system consisting of a cellulose, at least one vinyl monomer, an emulsifying agent and water at 85°–90° C in the absence of a polymerization initiator. They have described that the emulsifying agent for polymerization according to the said process shows complicated actions and graft-copolymerization efficiency is remarkably varied with difference in the kind of the emulsifying agent.

The present inventors have succeeded in the graft-copolymerization of vinyl monomer on a cellulose at further high efficiency in the absence of a polymerization initiator and an emulsifying agent. That is, the present invention is to provide a process for the plasticization of a cellulose by graft-copolymerization of at least one vinyl monomer on the cellulose, which comprises heating a system consisting of a cellulose, at least one vinyl monomer and water, without using a polymerization initiator and an emulsifying agent, in the form of a heterogeneous system at a temperature from room temperature to the boiling point of water under atmospheric or elevated pressure.

Suitable celluloses in the present invention include wood cellulose, leaf cellulose, stem cellulose, bast cellulose (e.g. hemp), seed fiber cellulose (e.g. cotton) and pulp. According to the present invention, a system consisting of a fibrous cellulose, at least one vinyl monomer and water is heated, whereby the vinyl monomer is polymerized on the activated points produced on the surface of said cellulose, to obtain a cellulose graft-copolymer consisting of cellulose as the main chain and vinyl polymer as the side chain.

Suitable vinyl monomers in the present invention are, for example, represented by the following structural formulas:

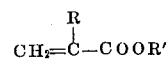

where R represents —H or —CH$_3$ and R' represents an alkyl group containing one to 18 carbon atoms; —H;

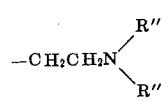

where R'' represents H or an alkyl group containing one to four carbon atoms; —(CH$_2$CH$_2$O)n$_1$R''' where R''' represents —h or an alkyl group containing one to four carbon atoms and n$_1$ is one to four:

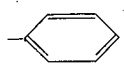

or a nuclear-substituted alkyl derivative, or

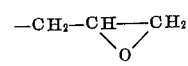

and

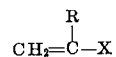

where R represents —H or —CH$_3$ and X represents Cl; —OCOCH$_3$; —CN; —CONH$_2$; —CONHCH$_2$OR' where R' represents H or an alkyl group containing one to four carbon atoms;

or a nuclear-substituted alkyl derivative; CH$_2$ = CH—; —OR'' where R'' represents an alkyl group containing one to four carbon atoms; or

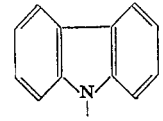

The monomers represented by the first formula are, for example, acrylic and methacrylic acid; acrylic and methacrylic acid esters of monohydric alcohols such as methyl, ethyl propyl, butyl, iso-butyl, amyl, hexyl, heptyl, octyl, nonyl, decyl, undecyl, lauryl, tridecyl, myristyl, pentadecyl, cetyl heptadecyl and stearyl alcohols; acrylic and methacrylic monoesters of polyhydric alcohols such as ethylene glycol, diethylene glycol, triethylene glycol and tetraethylene glycol; acrylic and methacrylic acid esters of alkoxy glycols such as methyl cellosolve, ethyl cellosolve, propyl cellosolve, butyl cellosolve, methoxy diethylene glycol, methoxy triethylene glycol, methoxy tetraethylene glycol, ethoxy diethylene glycol, ethoxy triethylene glycol, ethoxy tetraethylene glycol, propoxy diethylene glycol, propoxy triethylene glycol, propoxy tetraethylene glycol, butoxy diethylene glycol, butoxy triethylene glycol and butoxy tetraethylene glycol; acrylic and methacrylic acid esters of aminoethyl alcohol; acrylic and methacrylic acid esters of dialkylaminoethyl alcohols such as dimethylaminoethyl, diethylaminoethyl, dipropylaminoethyl and dibutylaminoethyl alcohols; acrylic and methacrylic esters of phenol and its derivatives such as cresol and xylenol; acrylic and methacrylic esters of 2,3-epoxy propyl alcohol.

The monomers represented by the second formula are, for example, styrene; nuclear-substituted styrenes such as o-methyl styrene, m-methyl styrene, p-methyl styrene, 2,4-dimethyl styrene, 2,5-dimethyl styrene, 2,4,5-trimethyl styrene, p-ethyl styrene, p-isopropyl styrene and the like; αmethyl-styrene nuclear-substituted α-methylstyrene such as o-methyl, m-methyl, p-methyl 2,4-dimethyl, 2,5-dimethyl, 2,4,5-trimethyl, p-ethyl and p-isopropyl α-methylstyrene and the like; acryl-amide; acrylamide derivatives such as N-methylol acrylamide, N-methoxy methyl acrylamide, N-ethoxymethyl acrylamide, acrylamide; methacrylamide; methacrylamide derivatives such as N-methylol, N-methoxymethyl, N-ethoxymethyl, N-propoxymethyl and N-butoxymethyl methacrylamide; vinyl ether such as methyl vinyl ether, ethyl vinyl ether, propyl vinyl ether and butyl vinyl ether; butadiene; vinyl chloride; acrylonitrile; methacrylonitrile and vinyl carbazol.

Among these vinyl monomers, for typical example, methyl methacrylate and ethyl methacrylate can easily by itself graft-copolymerize on a cellulose in a very high conversion of graft-polymerization. On the other hand, for typical example, acrylonitrile can hardly by itself graft-copolymerize on a cellulose. But it is possible to introduce a monomer of the latter type into a cellulose in a large amount by using it in admixture with a monomer of the former type. That is, when a monomer of the former type produces activated points on a cellulose, a monomer capable of radial graft-copolymerizing with the said monomer, even if it can hardly by itself graft-copolymerize on the cellulose, is introduced into the cellulose, while being copolymerized with the said monomer. Thereby rubber elasticity, plastic properties and fibrous characteristics can freely be introduced into the polymer side chain of the cellulose. The amount of vinyl monomer is required to be 0.5 time or more the weight of the cellulose.

Preferably, water in the present invention contains no inorganic substance. The amount of water is required to be 30 times or more the weight of the cellulose. If the amount of water is smaller, cellulose is graft-polymerized to form a large spherical lump thereof, and, the effect of stirring and dispersion is weakened, whereby the yield of homopolymer is increased.

Therefore, the efficiency is the highest in practical use, when the amount of water is 30 to 100 times the weight of the cellulose. The addition of a water-soluble organic solvent such as methanol, ethanol or dioxane obstructs the graft-copolymerization remarkably, and the graft-polymerization does not occur in the absence of water.

It is desirable that the temperature of graft-copolymerization is closer to the boiling point of water, but the graft-copolymerization can proceed even at room temperature. Preferable temperature is in the range from 40° C to 100° C. The grafting of low boiling monomers such as vinyl chloride, butadiene, chloroprene and vinyl ether can be carried out under elevated pressure. In the case of elevated pressure, the copolymerization velocity can be estimated by the decrease of pressure. The pressure is preferably between 1 atm. and 10 atm.

Although the details of reaction mechanism are obscure in the case of grafting vinyl monomers on a cellulose; this graft-copolymerization may probably follow the radical polymerization mechanism, because it is subjected to the polymerization inhibition by a conventional radical polymerization inhibitor such as hydroquinone or hydroquinone monomethyl ether.

The presence of absence of oxygen or air does not substantially affect the present graft copolymerization. However, the presence of oxygen prolongs the induction period prior to the initiation of polymerization, and hence the removal of oxygen or air is desirable.

The grafted cellulose obtained by the process of this invention is insoluble in organic solvents and, even in the case of grafting a large amount of vinyl monomer, is merely subjected to swelling with solvent but is not dissolved in most solvents. Therefore, in the graft-copolymerization on a cellulose, some of homopolymer or a polymer prepared by the copolymerization of vinyl monomers by themselves is formed as the by-product in addition to the graft polymer, but unreacted monomers, homopolymers and ungrafted copolymers are soluble in organic solvents and the perfect separation and purification can easily be made by selecting an organic solvent in accordance with the kinds of monomer employed and extracting therewith.

The structure of the grafted cellulose obtained by the process of the present invention is as follows, although it varies depending upon the condition of graft-copolymerization. For example, when 1 part by weight of cellulose, 10 parts by weight of methyl methacrylate and 100 parts by weight of water are charged into a closed vessel, the air therein is replaced with nitrogen and the mixture is heated at 90° C for 7 hours, the monomer polymerizes at a conversion of polymerization of 99 percent. After removing the homopolymer by extracting with acetone for 30 hours, the weight increase of 530 percent based on the weight of the cellulose is observed. The homopolymer of methyl methacrylate is obtained by removing off acetone from the extract. In the case of subjecting a system consisting of methyl methacrylate and water, that is, a system wherein no cellulose is present, to polymerization under the said conditions, the conversion of polymerization is at most only 20 percent, and it is, therefore, understood that the polymerization of methyl methacrylate is accelerated by the presence of cellulose. In the case of subjecting to polymerization under said conditions a system wherein styrene is substituted for a half amount of methyl methacrylate in the aforementioned system, and extracting the reaction mixture with a mixture solvent of acetone and benzene, it is found that the polymerization proceeds according to the same reactivity ratio ($r_1$, $r_2$) as that of the general copolymer composition of said two monomers, by measuring the composition of the thus obtained polymer and the amounts of homopolymers and unreacted monomers. Therefore, it may be presumed that the composition of the copolymer directly graft-copolymerized on a cellulose is quite the same in reactivity ratio of copolymerization as that of the general copolymer of vinyl monomers. On the other hand, it has been found by the measurement of the amount of chlorine that the cellulose graft-copolymerization of a monomer mixture containing vinyl chloride monomer proceeds according to the reactivity ratio ($r_1$, $r_2$) in the general copolymerization of vinyl monomers.

In the graft-copolymerized cellulose thus obtained, graft-copolymerization is caused on the activated point of cellulose surface, and hence it is observed under microscopic observation that the diameter of cellulose monofilament is increased. Due to difference in degree of water absorption between graft cellulose and non-graft cellulose, the two can perfectly be distinguished from each other in water, because the cellulose of no graft-copolymerization absorbs water to become semitransparent, while the graft-copolymerized cellulose is opaque. Further, the dyeing by a direct dyestuff is remarkably different between the two. Further, the said graft-copolymerized cellulose fibers are mutually welded by hot press, to prepare semitransparent paper or film-like material.

The terms "graft efficiency", "conversion of graft polymerization" and "weight increase" used herein are defined by the following formulas:

Graft efficiency (%)
$$= \frac{\text{Amount of graft-polymerization}}{\text{Polymerization amount of vinyl monomer}} \times 100$$

Conversion of graft-polymerization (%)
$$= \frac{\text{Amount of graft-polymerization}}{\text{Weight of vinyl monomer employed}} \times 100$$

Weight increase (%)
$$= \frac{\text{Amount of graft-polymerization}}{\text{Weight of cellulose}} \times 100$$

The amount of graft-polymerization is calculated by subtracting the initial weight of cellulose from the weight of graft-polymer.

The following Examples illustrate the invention. The parts referred to therein are parts by weight.

EXAMPLE 1

To 1 part of needle-leaf tree pulp and 100 parts of water, 10 parts of the vinyl monomer shown in the following table were added, and the mixture was polymerized at 85° C for 5 hours. The conversion of polymerization was as follows:

|  | Conversion of polymerization % |
|---|---|
| Methyl methacrylate | 99.6 |
| Ethyl methacrylate | 97.5 |
| Isobutyl methacrylate | 97.0 |
| 2-Ethoxyethyl methacrylate | 7.0 |
| Methacrylic acid | 0.6 |
| Acrylonitrile | 0 |
| Glycidyl methacrylate | 0 |
| Styrene | 0 |

When a cellulose was not present, the conversion of methyl methacrylate was 23.0 percent.

The polymers obtained in the process were extracted for 30 hours with acetone, at the boiling point of acetone in which the homopolymer present was dissolved out.

The residual acetone-insoluble polymer was a graft polymer having the following weight increase, conversion of graft-polymerization and graft efficiency.

|  | Weight increase (%) | Conversion of graft-polymerization (%) | Graft efficiency (%) |
|---|---|---|---|
| Methyl methacrylate | 530 | 53 | 53 |
| Ethyl methacrylate | 522 | 52 | 54 |
| Isobutyl methacrylate | 504 | 50 | 52 |
| 2-ethoxyethyl methacrylate | 35 | 4 | 50 |
| Methacrylic acid | 3 | 0.3 | 50 |
| Acrylonitrile | 0 | 0 | 0 |
| Glycidyl methacrylate | 0 | 0 | 0 |
| Styrene | 0 | 0 | 0 |

EXAMPLE 2

1 Part of needle-leaf tree pulp, 5 parts of methyl methacrylate and 100 parts of pure water were mixed with 5 parts of one of the following monomers, which were capable of copolymerizing with methyl methacrylate, and the mixture was polymerized at 85° C for 5 hours, the homopolymer so produced was extracted and removed. The measured weight increase of the obtained graft-polymer based on the starting pulp was as follows:

|  | Weight increase (%) |
|---|---|
| Ethyl methacrylate | 527 |
| n-Butyl methacrylate | 510 |
| Lauryl methacrylate | 355 |
| Stearyl methacrylate | 262 |
| Glycidyl methacrylate | 100 |
| 2-Diethylaminoethyl methacrylate | 95 |
| 2-Hydroxyethyl methacrylate | 110 |
| 2-Ethoxyethyl methacrylate | 210 |
| Butoxy triethylene glycol methacrylate | 195 |
| Methacrylic acid | 100 |
| Styrene | 140 |
| Methyl acrylate | 420 |
| Ethyl acrylate | 410 |
| 2-Ethylhexyl acrylate | 225 |
| Phenyl acrylate | 244 |
| Acrylamide | 75 |
| N-butoxymethyl acrylamide | 150 |
| Acrylonitrile | 60 |
| Methacrylonitrile | 62 |
| Vinyl acetate | 55 |

EXAMPLE 3

1 Part of needle-leaf tree pulp, 5 parts of ethyl methacrylate and 90 parts of pure water were mixed with 5 parts of one of the following monomers, which were capable of copolymerizing with ethyl methacrylate, and the mixture was polymerized at 90° C for 5 hours. The formed homopolymer was extracted and removed. The measured weight increase of the obtained graft-polymer based on the starting pulp was as follows:

|  | Weight Increase (%) |
|---|---|
| Methyl acrylate | 445 |
| Dimethylphenyl methacrylate | 222 |
| 2-Ethylhexyl methacrylate | 235 |
| 2-Aminoethyl methacrylate | 95 |
| 2-Diethylaminoethyl methacrylate | 100 |
| 2-Dimethylaminoethyl acrylate | 100 |
| Diethyleneglycol monomethacrylate | 125 |
| Methoxy diethyleneglycol acrylate | 172 |
| Glycidyl methacrylate | 115 |
| Methacrylic acid | 105 |
| Acrylic acid | 102 |
| N-methylol acrylamide | 135 |
| Methacrylamide | 66 |
| Ethyl vinyl ether | 40 |
| N-vinyl carbazole | 165 |
| α-methyl styrene | 110 |

EXAMPLE 4

10 Parts of pulp (90 percent α-cellulose), 50 parts of methyl methacrylate, 50 parts of butadiene and 500 parts of distilled water were heated at 80° C. The internal pressure was 8 atm. initially, which was reduced during the polymerization to 3.0 atm. after 8 hours. After that time, the butadiene was removed by opening the valve and, after cooling and filtration, the polymer thus obtained was added to a large amount of methanol, to obtain 35 parts of precipitate which, since it contained ungrafted cellulose, gave 26 parts of the cellulose graft-polymer after benzene extraction for 30 hours. According to the measurement of the copolymerization ratio of the extract in another experiment, the copolymerization reactivity ratios of butadiene ($r_1$) and methyl methacrylate ($r_2$) were 0.25 and 0.75, respectively.

EXAMPLE 5

10 Parts of needle-leaf tree pulp, 50 parts of ethyl methacrylate, 50 parts of vinyl chloride nd 500 distilled parts of distilled water were heated for 7 hours as in Example 4, to give 45 parts of polymer precipitated, which was extracted with tetrahydrofuran, to yield 35 parts of graft-copolymerized cellulose.

EXAMPLE 6

10 Parts of cellulose, 10 parts of methyl methacrylate, 30 parts of styrene and 400 parts of distilled water were heated in a three-necked flask, under stirring at 85° C with bubbling of nitrogen gas. After heating for 7 hours, it was filtered, to obtain 36 parts of polymer. This polymer was subjected to benzene extraction for 24 hours, to prepare 15 parts of a graft-copolymerized cellulose.

EXAMPLE 7

1 Part of cotton, 4 parts of ethyl methacrylate, 0.7 part of methacrylic acid and 50 parts of water were heated at 90° C, in a three-necked flask with the bubbling of nitrogen gas, and the reaction system was stirred by a high speed rotary stirring machine ("Homomixer" manufactured by Tokushu Kika Kogyo Kabushiki Kaisha, rotation speed: 7,900 rpm), to obtain 2.4 parts of polymer. The obtained polymer was extracted by the mixture system of benzene and acetone (8:2), to yield 2.1 parts of a grafted cotton.

EXAMPLE 8

10 Parts of hemp which had previously been dipped in 5 percent caustic soda for 20 hours, were freed from alkali by water washing, and were dried; the material was then mixed with 50 parts of methyl methacrylate, 300 parts of distilled water and 20 parts of glycidyl methacrylate, and polymerized as in Example 6 to give, after acetone extraction, 22 parts of a graft polymer.

What is claimed is:

1. A process for the preparation of graft-copolymerized cellulose which consists heating a system of three or more components consisting essentially of cellulose, at least one vinyl monomer and water in the liquid start at a temperature from room temperature to the boiling point of water under atmospheric or elevated pressure wherein the amount of water is 30 times or more the weight of cellulose.

2. A process, according to claim 1, wherein the cellulose is a fibrous cellulose selected from the group consisting of wood cellulose, leaf cellulose, stem cellulose, bast cellulose, seed fiber cellulose and pulp.

3. A process, according to claim 1, wherein the vinyl monomers are represented by the following structural formula:

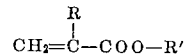

where R represents —H or —CH$_3$ and R' represents an alkyl group containing one to 18 carbon atoms; —H;

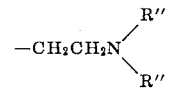

where R'' represents H or an alkyl group containing one to four carbon atoms; —(CH$_2$CH$_2$O)$_n$ R''' where R''' represents —H or an alkyl group containing one to four carbon atoms and $n_1$ is one to four;

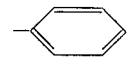

or a nuclear-substituted alkyl derivative thereof; or

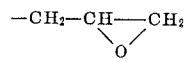

4. A process according to claim 1, wherein the vinyl monomer are represented by the following structural formula:

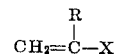

where R represents —H or —CH$_3$ and X represents Cl; —OCOCH$_3$; —CN; —CONH$_2$; —CONHCH$_2$OR' where R' represents H or an alkyl group containing one to four carbon atoms;

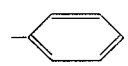

or a nuclear-substituted alkyl derivative thereof; —CH=CH$_2$; —OR'' where R'' represents an alkyl group containing one to four carbon atoms; or

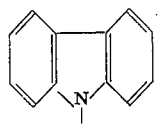

5. A process according to claim 1, wherein the amount of vinyl monomers is 0.5 times or more the weight of cellulose.

6. A process according to claim 1, wherein the heating temperature is between 40° C and 100° C.

7. A process according to claim 1, wherein the pressure is between 1 atm. and 10 atm.

* * * * *

UNITED STATES PATENT OFFICE
CERTIFICATE OF CORRECTION

PATENT NO. : 3,687,878
DATED : August 29, 1972
INVENTOR(S) : Minoru IMOTO et al.

It is certified that error appears in the above-identified patent and that said Letters Patent are hereby corrected as shown below:

On the Title page insert:

--[30] Foreign Application Priority Data

May 11, 1966   Japan.....29883/66--

Signed and Sealed this

Twenty-eighth Day of June 1977

[SEAL]

Attest:

RUTH C. MASON
Attesting Officer

C. MARSHALL DANN
Commissioner of Patents and Trademarks